UNITED STATES PATENT OFFICE.

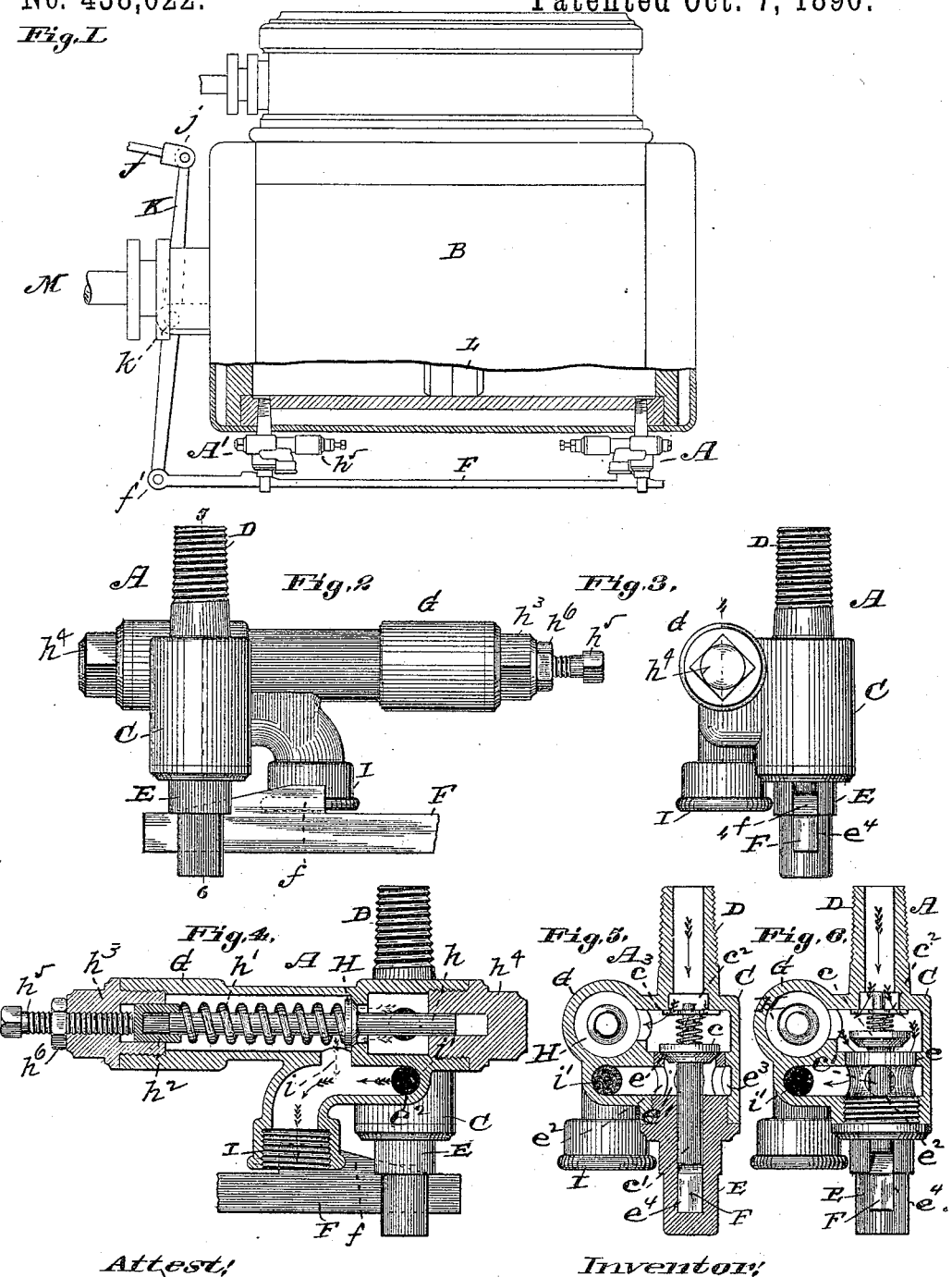

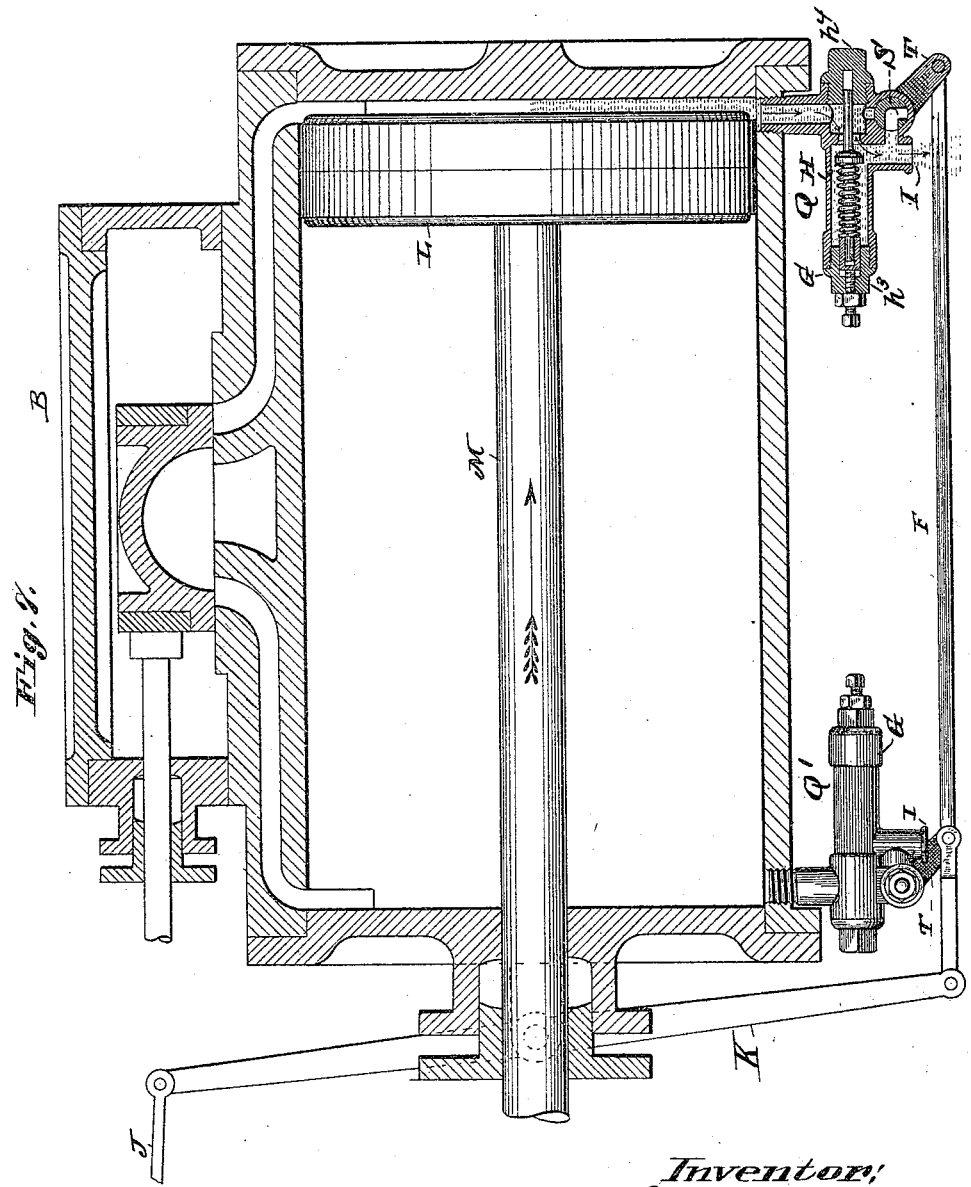

JOSEPH RYAN, OF ST. LOUIS, MISSOURI; ELIZABETH RYAN EXECUTRIX OF SAID JOSEPH RYAN, DECEASED.

CYLINDER-COCK.

SPECIFICATION forming part of Letters Patent No. 438,022, dated October 7, 1890.

Application filed July 22, 1889. Serial No. 318,291. (No model.)

*To all whom it may concern:*

Be it known that I, JOSEPH RYAN, of St. Louis, Missouri, have made a new and useful Improvement in Cylinder-Cocks, of which the following is a full, clear, and exact description.

The improvement relates to that class of cylinder-cocks having a safety-valve attachment. The improved cylinder-cock is adaptable to steam-cylinders generally, and to locomotive-cylinders especially. It is useful not only in relieving the cylinders of water, but also in preventing a vacuum from being formed in the cylinder when the steam is shut off therefrom, substantially as hereinafter described and claimed, aided by the annexed drawings, forming part of this specification, of which—

Figure 1 represents a locomotive-cylinder having two of the improved cocks attached thereto. The view shows the cylinder partly boxed and in side elevation and partly in longitudinal central section, and the cocks are shown in side elevation. Fig. 2 represents a side elevation of the improved cock; Fig. 3, an end elevation of the same; Fig. 4, a vertical longitudinal view of the cock, partly in section on the line 4 4, Fig. 3, and partly in elevation, looking to the right, as shown. Figs. 5 and 6 are vertical views of the cock, partly in section, on the line 5 6, Fig. 2, and partly in elevation, looking to the right, as shown, the valves being shown in different positions; and Fig. 7, a view of a locomotive-cylinder having two cocks attached thereto, the cylinder and one cock being shown in central longitudinal section and the piston and piston-rod and the other cock in side elevation.

The cocks shown in Fig. 7 represent a modification of what is somewhat different from those shown in the other figures.

The figures referred to are on various scales.

The same letters of reference applied to the drawings denote the same parts.

A, Figs. 1, 2, 3, 4, 5, and 6, represents the improved cock, which in Fig. 1 is represented attached, as when in use, to a locomotive-cylinder B.

C is a hollow cylindrical portion of the cock, which I designate the "blow-off portion," whereof the upper end forms the stem or shank D of the cock, which stem by screwing it into the cylinder is the means whereby the cock is attached to the cylinder. The said blow-off portion C of the cock contains as follows: the central plug E, screwed longitudinally into the portion C at the lower end thereof, the blow-off valve $c$, the valve-stem $c'$, and, coiled around said stem above the valve, the valve-spring $c^2$, compressed between the perforated bearing-plate $c^3$ and the valve and adapted to press the valve into the seat in the absence of sufficient steam-pressure thereon. The said central plug E in turn is adapted to receive longitudinally the valve-stem $c'$ into the upper end of the plug, and said upper end is adapted to form the valve-seat $e$ of the blow-off valve $c$. Under the valve $c$ and between the valve-stem $c'$ and the inside of the shell of the plug E is a passage $e'$, from which the outlet-ports $e^2$, through the shell of the plug E, lead to the passage $e^3$ around the outside of the plug. The lower end of the plug E, which projects from and below the portion C, is slotted at $e^4$, as shown, to receive the opening-bar F, having the wedge-shaped projections $f$, adapted when the bar is moved longitudinally in the direction pointed by the wedge-point to encounter the lower end of the valve-stem $c'$, which is made to penetrate through the plug down to the slot, and thereby raise the stem and unseat the blow-off valve $c$.

G represents another hollow cylindrical portion of the cock, which I designate the "safety-valve portion," and which contains the safety-valve H, the stem thereof $h$, the spring $h'$, and the follower $h^2$. The spring $h'$ is coiled around the stem $h$, and by its compression between the follower $h^2$ and the safety-valve H presses the safety-valve to seat. The ends of the portion G are closed, respectively, by the hollow plugs $h^3$ and $h^4$. One end of the safety-valve stem is guided by the recess in the follower $h^2$, which in turn is guided by the recess in the hollow plug $h^3$, and adjusted by the adjusting-screw $h^5$, which passes through the hollow plug $h^3$, and is locked in any desired position by the lock-nut $h^6$. The other end of the safety-valve stem is guided by the recess in the hollow plug $h^4$.

I represents the union discharge-port, which receives and discharges the water from the safety-valve port $i$ and from the blow-off port $i'$.

J is a rod extending from the cab of the locomotive, and jointed at $j$ to one end of the lever K, which works on a bearing at $k$, and is jointed at its other end to the opening-bar F at $f'$.

L is the piston of the steam-cylinder B, and M the piston-rod thereof.

A', Fig. 1, is another cylinder-cock, a duplicate of the one A above described, excepting that the relative positions of portions of the cock are changed, so that the end $h^5$ of A' will point inwardly under the cylinder, whereas if the change was not made the end $h^5$ would project out beyond the end of the cylinder.

The operation of the improved cock is as follows: The blow-off valve $c$ is operated by the longitudinal movement of the bar F, having the wedge-shaped projection $f$, by means of the rod J and lever K. When it is desired to open the valve, the rod J is drawn toward the rear of the locomotive or to the left, as shown in Fig. 1, by which movement the bar is moved forward and the wedge-shaped projection encounters the lower end of the valve-stem $c'$, raises it, unseats the blow-off valve $c$, as shown in Fig. 6, and permits steam and water from the cylinder to blow off past the valve, through the passage $e'$ and ports $e^2$, into and out through the union discharge-port I. A reverse motion of the rod J, and consequently of the lever K and bar F, will withdraw the wedge-shaped projection from under the end of the valve-stem $c'$ and allow the valve $c$ to again be pressed to its seat by the spring $c^2$ or by the steam-pressure from the cylinder, as shown in Fig. 5. If at any time the blow-off valve is allowed to remain closed until there is an accumulation of water in the cylinder, then when the piston approaches near to the end of the stroke the water, being highly pressed between the piston-head and the cylinder-head, is forced out through the stem of the cock into the blow-off portion C, pressing to seat the valve $c$, unseating the safety-valve H, and escaping past it through the port $i$ and out through the union discharge-port I, as shown by the arrows, Fig. 4. This movement of the safety-valve H will occur even though the blow-off valve $c$ be open either partially or wholly, provided the pressure on the water in the cylinder is so great as to force therefrom a greater quantity of water than can find adequate means of immediate escape past the blow-off valve $c$.

By means of the set-screw $h^5$ and follower $h^2$ the spring $h'$ may be set to exert any desired pressure upon the safety-valve H. Preferably it should be set to exert a pressure slightly above the initial steam-pressure in the cylinder, so that a higher pressure than the steam-pressure will be required to unseat the safety-valve.

The union discharge-ports I I may be united, so as to have but one discharge-pipe for the two cocks.

Fig. 7 is introduced for the purpose of illustrating the fact that certain elements of the improvement can be used in connection with a cylinder-cock having in combination a safety-valve portion and a blow-off-valve portion, but which blow-off-valve portion is in some respects constructed differently from the blow-off-valve portion hereinbefore described. In this figure B represents a steam-cylinder in central section, with the piston L and piston-rod M in side elevation. Q represents one of the cylinder-cocks in section, and Q' the other one in side elevation. These cocks resemble the hereinbefore-described cocks A and A' to the extent that both forms of said cock have the described safety-valve portion G, embracing the described adjustable feature thereof, and also that the cocks Q may, like those of the A description, be in their attachment placed close to the cylinder, and thereby secure the hereinbefore-described advantages arising from said close connection, and, further, that the cocks Q and Q' are each respectively unaffected by the action of the other, as is the case with the cocks A and A'; also, like the cocks A A', there may be a common inlet to and a common outlet from the safety-valve portion and the blow-off-valve portion. The difference between the said cocks A and Q is that A has the described seating-valve $c$, Figs. 5 and 6, which operates as an automatic vacuum-preventing valve, and is also operated when desired as a blow-off valve by means of the described opening-bar, whereas the cock Q has in the place of the described valve $c$ the plug-cock S, Fig. 7, which is operated by means of the crank T and connections, as shown, Fig. 7, as a blow-off cock only, but not as an automatic vacuum-preventing valve, as is the case with the cock A.

In said Fig. 7 the piston is represented as at or near the end of its stroke and the water being forced from the cylinder by the piston. The plug-cocks S being closed, the water has unseated the safety-valve H and is escaping past it and out through the discharge-port I, as indicated by the arrows.

The form of cylinder-cock shown in Figs. 1 to 6 is adapted more especially to high-pressure engines, whereas the cocks shown in Fig. 7 is adapted more especially to low-pressure engines.

Wherever "an adjustable safety-valve" is mentioned in this specification I mean a safety-valve which can be at once adjusted from the outside of the cock in contradistinction to those valves which are adjustable only by gaining access to the interior of the cock, which necessitates taking the cock to pieces.

I claim—

1. In a cylinder-cock, the combination, with the casing having the threaded stem D and the parts C G at right angles to each other, of the screw-plug E, having the valve-seat $e$ and orifices or ports $e^2$, communicating with the common discharge-opening I through the passage $e^3$ and port $i'$, the upwardly-opening valve $c$, the spring $c^2$ to close said valve, and an outwardly-opening adjustable safety-valve situated in the part G of the casing and discharging through the port $i$ and common opening I, substantially as specified.

2. In a cylinder-cock, the combination, with the casing having the parts C G at right angles to each other, of a blow-off cock constructed substantially as described and situated in the part C of the casing, the outwardly-opening valve H, situated in the part G and having a seat at the junction of the parts C and G of the casing, the valve-stem $h$, having one guide-recess in the plug $h^4$ and the other in the follower, the follower $h^2$, moving in a recess in the plug $h^3$, the spring $h'$, surrounding the stem between the valve and follower, and the adjusting-screw $h^5$, impinging on said follower, both the blow-off valve and the safety-valve having a common discharge-opening from the stem, substantially as specified.

Witness my hand this 15th day of July, 1889.

JOSEPH RYAN.

Witnesses:
  C. D. MOODY,
  D. W. C. SANFORD.